(12) United States Patent
Artuso

(10) Patent No.: US 12,010,525 B2
(45) Date of Patent: *Jun. 11, 2024

(54) PRIORITIZING AN ISSUE REPORTED BY A USER OF A WIRELESS TELECOMMUNICATION NETWORK

(71) Applicant: T-Mobile USA, Inc., Bellevue, WA (US)

(72) Inventor: Daniel Artuso, Concord, CA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/169,071

(22) Filed: Feb. 14, 2023

(65) Prior Publication Data
US 2023/0199515 A1 Jun. 22, 2023

Related U.S. Application Data

(63) Continuation of application No. 17/193,950, filed on Mar. 5, 2021, now Pat. No. 11,617,093.

(51) Int. Cl.
H04L 41/142 (2022.01)
H04L 41/149 (2022.01)
(Continued)

(52) U.S. Cl.
CPC .......... *H04W 16/22* (2013.01); *H04L 41/142* (2013.01); *H04L 41/149* (2022.05); *H04L 41/16* (2013.01);
(Continued)

(58) Field of Classification Search
CPC ....... G06N 3/004–105; G06N 7/00–08; G06N 20/00–20; H04B 17/0082–3913; H04L 41/02–5096; H04L 43/02–55; H04L 65/10–80; H04M 1/24; H04M 3/22–367; H04M 7/006–0087; H04M 2203/05–058; H04M 2203/40–408; H04M 2203/55–559; H04W 8/18–245; H04W 16/18–225; H04W 24/02–10; H04W 60/005–06; H04W 64/003–006; H04W 84/005–22; H04W 88/18–188
See application file for complete search history.

(56) References Cited

U.S. PATENT DOCUMENTS 6,609,050 B2  8/2003  Haynes et al.
6,931,387 B1  8/2005  Wong et al.
(Continued)

*Primary Examiner* — Timothy J Weidner
(74) *Attorney, Agent, or Firm* — Perkins Coie LLP

(57) ABSTRACT

The disclosed system and method obtain a report of an issue reported by a user of the wireless telecommunication network, and historical information associated with the user and the wireless telecommunication network. The historical information includes multiple issues reported by users similar to the user, and multiple user statuses associated with the users similar to the user. The user status among the multiple user statuses includes active and inactive, indicating whether the user is an active member of the telecommunication network or has left the network. The system provides the historical information to an AI model, and obtains from the AI model a priority associated with the issue experienced by the user. The system causes a resolution of the issue based on the priority.

20 Claims, 5 Drawing Sheets

(51) Int. Cl.
*H04L 41/16* (2022.01)
*H04L 41/5067* (2022.01)
*H04L 43/00* (2022.01)
*H04L 43/062* (2022.01)
*H04L 43/065* (2022.01)
*H04L 43/067* (2022.01)
*H04W 8/18* (2009.01)
*H04W 16/22* (2009.01)
*H04W 24/08* (2009.01)
*H04W 24/10* (2009.01)
*H04W 84/02* (2009.01)
*H04W 88/18* (2009.01)

(52) U.S. Cl.
CPC ........ *H04L 41/5067* (2013.01); *H04L 43/062* (2013.01); *H04L 43/065* (2013.01); *H04L 43/067* (2013.01); *H04L 43/14* (2013.01); *H04W 8/18* (2013.01); *H04W 24/08* (2013.01); *H04W 24/10* (2013.01); *H04W 84/02* (2013.01); *H04W 88/18* (2013.01)

(56) References Cited

U.S. PATENT DOCUMENTS

| | | |
|---|---|---|
| 7,062,076 B1 | 6/2006 | Osborne et al. |
| 7,308,388 B2 | 12/2007 | Beverina et al. |
| 8,693,751 B2 | 4/2014 | Osborne et al. |
| 9,942,779 B1* | 4/2018 | Proctor ................. H04W 24/02 |
| 10,019,302 B2 | 7/2018 | Nguyen et al. |
| 10,073,845 B2 | 9/2018 | Bank et al. |
| 11,617,093 B1* | 3/2023 | Artuso ................. H04W 16/22 |
| 2002/0072808 A1 | 6/2002 | Li |
| 2003/0171851 A1 | 9/2003 | Brickfield et al. |
| 2003/0179229 A1 | 9/2003 | Van Erlach et al. |
| 2007/0281708 A1 | 12/2007 | Bakhuizen et al. |
| 2009/0177495 A1 | 7/2009 | Abousy et al. |
| 2010/0138925 A1 | 6/2010 | Barai et al. |
| 2010/0180156 A1 | 7/2010 | Aranguren et al. |
| 2012/0143808 A1 | 6/2012 | Karins et al. |
| 2014/0031056 A1 | 1/2014 | Cao |
| 2014/0372344 A1 | 12/2014 | Morris et al. |
| 2016/0196261 A1 | 7/2016 | Bank et al. |
| 2016/0241429 A1 | 8/2016 | Froehlich |
| 2016/0379106 A1 | 12/2016 | Qi et al. |
| 2017/0235628 A1 | 8/2017 | Nguyen et al. |
| 2018/0131810 A1 | 5/2018 | Yokel |
| 2019/0197442 A1 | 6/2019 | Lu |
| 2019/0311271 A1 | 10/2019 | Li et al. |
| 2019/0339840 A1 | 11/2019 | Park et al. |
| 2020/0019893 A1 | 1/2020 | Lu |
| 2020/0034842 A1 | 1/2020 | Ponniah et al. |
| 2020/0042865 A1 | 2/2020 | Lee et al. |
| 2020/0053155 A1 | 2/2020 | Shi et al. |
| 2020/0059552 A1 | 2/2020 | Kim et al. |
| 2020/0204628 A1 | 6/2020 | Desai et al. |
| 2020/0336394 A1 | 10/2020 | Mathur et al. |

* cited by examiner

PRIORITIZING AN ISSUE REPORTED BY A USER OF A WIRELESS TELECOMMUNICATION NETWORK

CROSS REFERENCE TO RELATED APPLICATIONS

This application is a continuation of U.S. patent application Ser. No. 17/193,950, filed Mar. 5, 2021 entitled PRIORITIZING AN ISSUE REPORTED BY A USER OF A WIRELESS TELECOMMUNICATION NETWORK, which is hereby incorporated by reference in its entirety.

BACKGROUND

Currently, whenever a user reports an issue with a telecommunication network, such as a dropped call or poor service at a particular location, the telecommunication network creates an issue ticket and assigns it a default priority before sending the ticket to an engineering team. Consequently, the engineering team is not aware of a level of importance of the issue that the user is facing. Thus, the engineering team does not have a way to prioritize the incoming issue tickets.

DETAILED DESCRIPTION

Described here is a system and method to dynamically and automatically determine a priority of an issue reported by a user, where the priority indicates to an engineering team which reported issue to focus on due to higher potential that the user will leave a wireless telecommunication network if the reported issue is not resolved sufficiently quickly. The system can Prioritize the issue based on historical information. The system can obtain a report of the issue reported by the user of the wireless telecommunication network. The system can obtain the historical information associated with the user and the wireless telecommunication network, where the historical information can include multiple issues reported by the user, multiple issues reported by users similar to the user, and user statuses associated with the users similar to the user. The user statuses can include active, dormant, and inactive, indicating that the user is an active user of the network, has not used the network for a predetermined period of time, or has left the network, respectively. Based on the historical information, the system can obtain a probability that individual users or groups of users disengage from the wireless telecommunication network within a predetermined number of days and a confidence associated with the probability. The system can determine a priority associated with the issue experienced by the user based on the probability, the predetermined number of days, and the confidence. Finally, the system can cause a resolution of the issue based on the priority, by, for example, modifying the report to include the determined priority. In this way, the system can determine, e.g. how likely a user is to leave as a subscriber to the telecommunication network, and can thus, prioritize issue tickets sent to an engineering team or other troubleshooting group associated with the telecommunications network to focus on certain users more likely to be disgruntled, impatient or otherwise dissatisfied.

Figure 1:
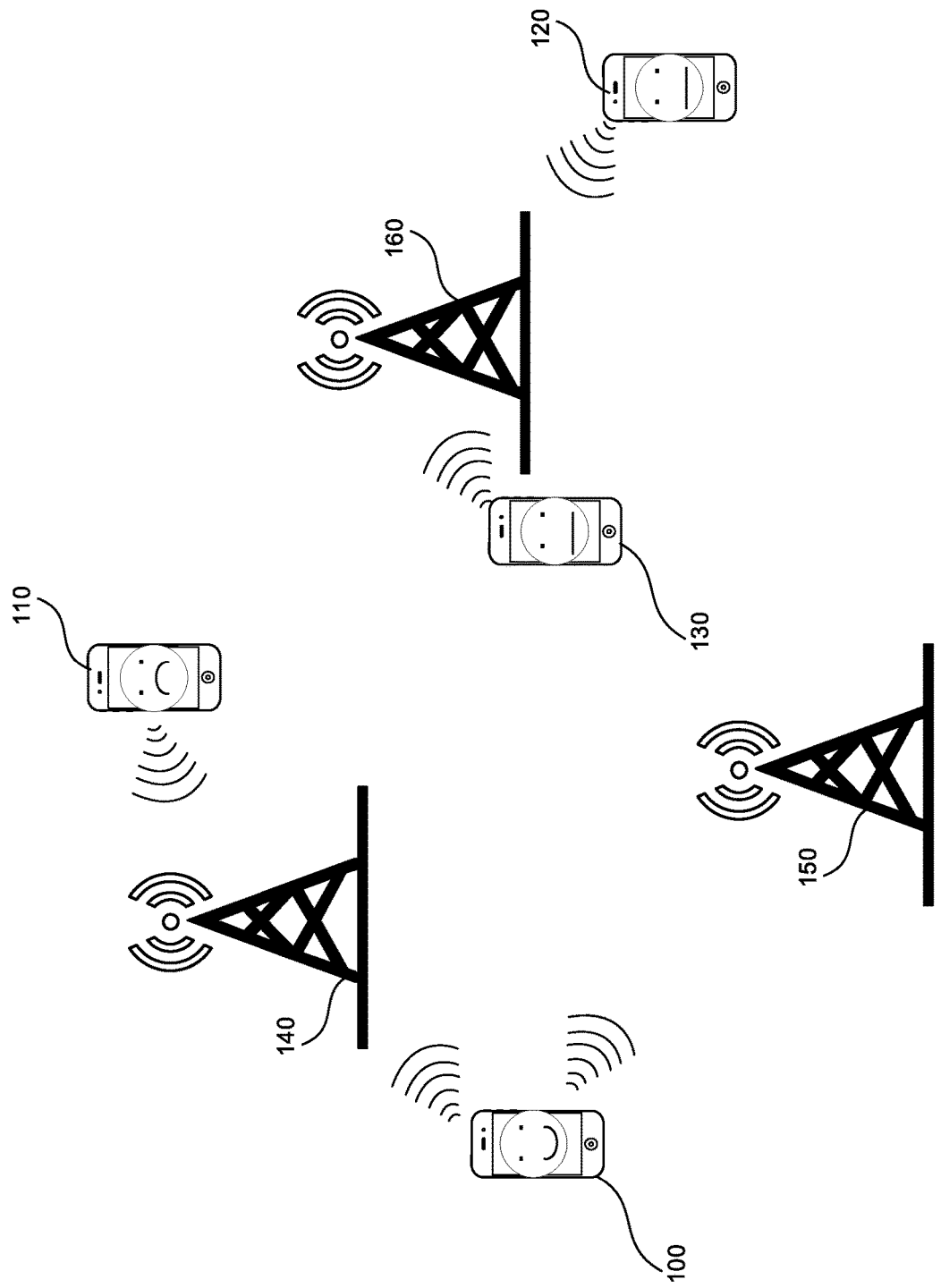
FIG. 1 shows a telecommunication network used by user equipment (UE) with different levels of satisfaction.

FIG. 1 shows a telecommunication network used by UEs with different levels of satisfaction. The telecommunication network includes multiple network elements 140, 150, 160, such as cell towers, sectors, antennas, routers, servers, etc. The multiple UEs 100, 110, 120, 130 can include mobile devices and can communicate with the elements 140, 150, 160 using various air interface protocols such as 2G, 3G, 4G, 5G.

The telecommunication network can provide service of varying quality to various mobile devices 100, 110, 120, 130. For example, the towers 140, 150, 160 can have various technical problems that affect the mobile devices 100, 110, 120, 130. In a more specific example, the tower 140 can drop calls, the throughput offered by the tower 160 can be low, and/or the coverage offered by the tower 150 can be limited due to interfering buildings and/or geographical features.

The users associated with UEs 110, 120, 130 can call a technical support center, e.g. a CARE center, to report problems. For example, a problem with the tower 140 can be reported before the problem with the tower 160 has been investigated and/or resolved. The operator receiving problems needs to be able to prioritize the reported problems, in order to efficiently allocate problem resolution resources. The operator can be an artificial intelligence (AI) model which automatically prioritizes the reported problems. The problem resolution resources can include additional processing power, additional antennas, sectors, and/or towers.

In another example, the users associated with UEs 110, 120, 130 call the telecommunication network almost simultaneously to report problems such as dropped calls and to request technical support. By default, a typical operator service level agreement (SLA) indicates that the time to investigate and fix the problem is three days. However, in practice, when multiple problems are simultaneously reported, the time to investigate and fix the problem can take longer. To determine which reported problem should be resolved first, the disclosed system can determine that the problem experienced by the user associated with UE 110 has already been reported by the user associated with UE 110 several times previously, while the problems reported by users associated with UEs 120, 130 are first-time reports. Consequently, the system can prioritize the problem reported by user associated with UE 110 higher than the problems reported by users associated with UEs 120, 130.

In a third example, two users, A and B, can call the technology support on the same day with different issues. User A reports low data speeds. Typically, the data speed for user A is 10 megabits per second (mbps) but now the data speed is 0.1 mbps. The reduction in data speed is 100 times. User B reports high drop calls. Typically, user B experiences 4 drops every day, but now user B is experiencing 5 drops a day. The increase in dropped calls is only 25%. Based on the numbers, issue reported by user A should get a higher priority than issue reported by user B. However, the system can determine that user B will most likely leave the wireless telecommunication network if the issue is not fixed. The system can make this determination based on the machine learning/artificial intelligence, historical data and other users with similar issues in the past, as described in FIG. 2. Consequently, the system assigns a higher priority to user B's ticket to engineering. User A's ticket can have the default priority of 3 days because no user experiencing an issue similar to user A's issue in the geographical area has ever left the wireless telecommunication network.

Figure 2:
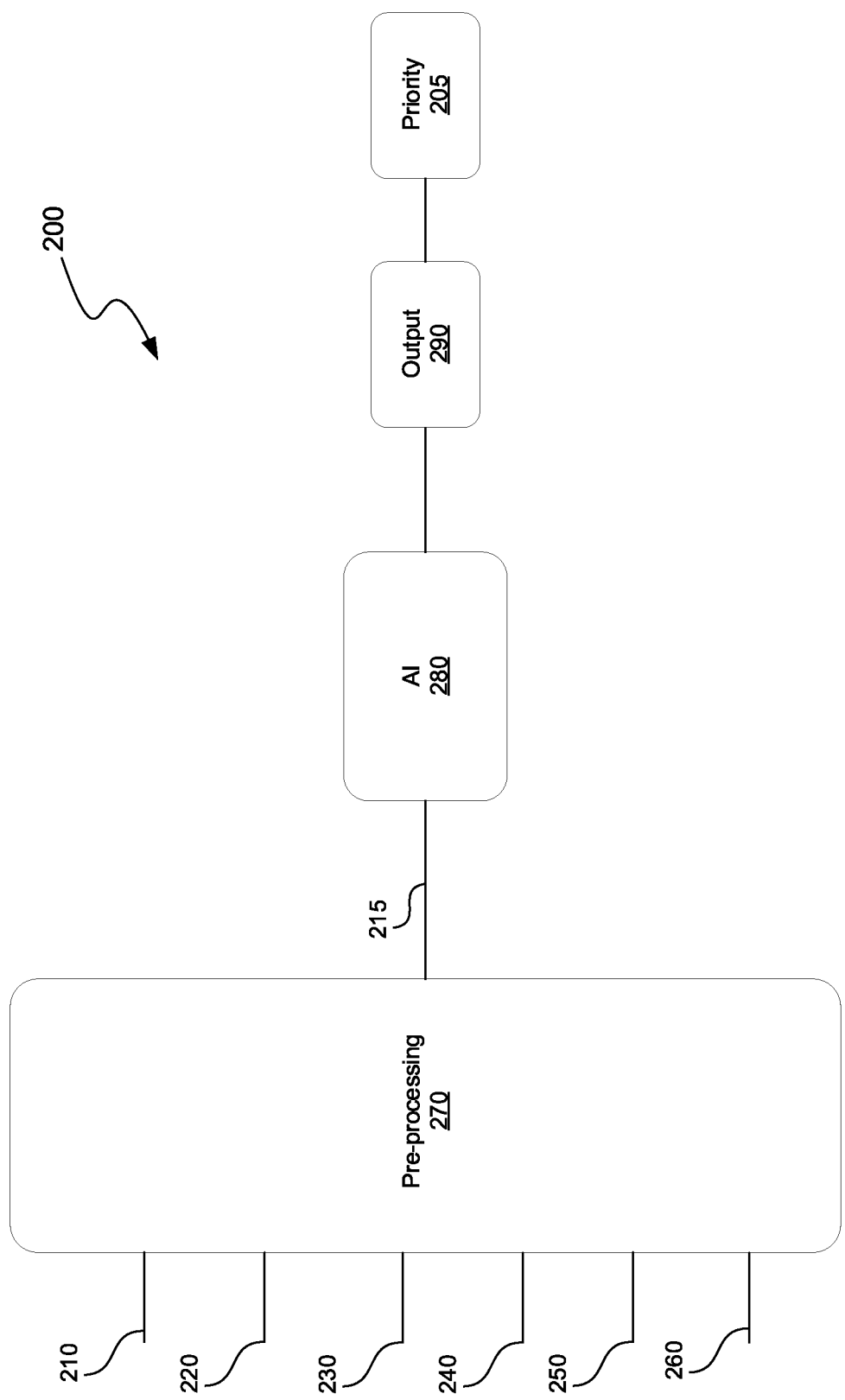
FIG. 2 shows a system to prioritize an issue reported by a user of a wireless telecommunication network.

FIG. 2 shows a system to prioritize an issue reported by a user of a wireless telecommunication network. The system 200 receives multiple inputs 210, 220, 230, 240, 250, 260, pre-processes them in step 270, and provides preprocessed inputs to an AI 280. The AI 280 can produce output 290, including a probability, for example, from 0 to 100%, that the user reporting the issue will leave the network within a predetermined amount of time, such as seven days from now, with a confidence measured between 0 to 100%. The system 200 can convert the output 290 into a priority 205.

The priority 205 can indicate an amount of time that can lapse prior to fixing the issue. For example, the default priority can be three days, but that value can change based on the probability that the user reporting the issue will leave the network and no longer be a subscriber.

Input 210 can include data on how many times previously the user has reported an issue. The issue can be the same or a similar issue. For example, the input 210 can indicate if this is the first, second, third, etc. time the user has called about an issue. If this is the first call, the priority assigned to the issue is lower than if this is the second call. Similarly, if this is the second call, the priority assigned to the issue will be lower than if this is the third call. In other words, the priority is correlated to the number of previous calls.

Input 220 can include the data from other users that reported an issue, who are within the same geographical area as the user, and who are no longer active subscribers of the network. For example, the other users may have left the network due to the unresolved issues. The data can include a type of issue reported by other users, a time at which the issue was reported, and a geographical area. The geographical area can be defined by an area served by the same telecommunication network topology, for example, the number of cell towers and their connectivity. For example, the user reporting the issue lives in a certain ZIP code and there are 50 other users in that particular ZIP code that also reported an issue. All of the reports were made within a timeframe during which there was no change to the telecommunication network topology. In other words, the telecommunication network topology is the same for all 51 users. Input 220 in combination with the below described inputs 230 can influence how the report of the issue is prioritized.

Inputs 230 can include data about status of the user such as active, inactive, or dormant. Active users are the current users of the telecommunication network. Inactive users are users that have left the telecommunication network, for example, have unsubscribed from the telecommunication network. Dormant users are users of the telecommunication network that have not used the telecommunication network for a predetermined period of time, such as one month, six months, or a year.

Input 230 can indicate how many of the users in input 220 are inactive and have left the network. The percentage of other users in input 220 that have left the telecommunication network can influence the priority of the issue reported by the user. For example, the higher the percentage of the other users in input 220 that have left the telecommunication network, the higher the priority of the issue reported by the user. In a more specific example, input 230 can indicate that half of the other 50 users have left the telecommunication network. Consequently, the system 200 can determine that there is a high probability that the user, who is in the same ZIP code as the other 50 users, will leave. As a result, the priority can be increased. For example, the priority in the above example can be changed from the default three days to one day.

A type of UE can affect priority, e.g. a 5G connected IoT device can have a lower priority than a gaming console, which has lower priority than a mobile phone. When a user reports an issue and the user is using a particular type of UE, the system gathers information from other users using that particular type of UE. For example, if the user reports an issue and the user is using an IoT device, the system gathers information from other users using an IoT device to determine the priority of the reported issue.

The input 230 changes frequently, such as every second, minute, or hour because new users join the network and old users leave. The system 200 can change input 230 every time a new report of an issue is received. For example, when the issue of the report is received, the system 200 can request an updated user status.

Inputs 240 can include data about network performance and network capacity for the telecommunication nodes serving the user making the report, such as a complaint to a CARE center. The nodes can include cell towers, sectors, and/or antennas. The performance can include throughput, drop rate, block rate, latency, voice quality, buffering or jitter. The drop rate is the fraction of the telephone calls which, due to technical reasons, were cut off before the speaking parties had finished their conversation and before one of them had hung up. This fraction is usually measured as a percentage of all calls. Block rate is a ratio of the number of erroneous blocks to the total number of blocks transmitted on a digital circuit.

Network capacity can also include a number of block calls and throughput. Network capacity and performance, along with inputs 210, 230, 250, 260, can help the AI 280 determine whether the reported issue is related to the telecommunication network problems, a high number of users of the network, or to the user.

For example, to determine whether the reported issues relate to the telecommunication network problems, the AI 280 can consider input 220 to see how frequently other users in the area have reported an issue. If other users in the area have reported an issue, the problem is likely related to the telecommunication network. If the problem is related to the telecommunication network, the system 200 can increase the priority of the issue because the issue is likely to affect multiple users.

To determine whether the reported issue is due to temporary problems such as an unusually high number of users, the AI 280 can determine that other users do not consistently report issues in the geographical area of the user. Further, based on the network capacity and performance, the AI can determine that the network capacity is good, because the node is configured well, but the network performance can be low because too many users are on the network. Depending on how frequently the high number of users occurs, the system 200 can increase or decrease the priority of the reported issue. For example, if the high number of users is a daily occurrence, the system 200 can increase the priority of the issue. However, if the high number of users is a monthly occurrence, the system 200 can decrease the priority of the issue.

To determine whether the issue is related to the user, the AI 280 can determine that the network performance is good, the network capacity is good, and that other users in the geographical area close to the user are not reporting problems. For example, the issue the user is experiencing can be due to the handset, or the user can be in a basement of the house, where the reception is poor. If the reported issue is due to the user, the system 200 can reduce the priority of the reported issue and can notify the user that the issue is likely with the handset or the specific location of the user.

Inputs 250 can include data about the network performance for the user. The system 200 can obtain call records indicating a call made by the user, and whether the call ended successfully, whether the call ended because it was dropped, or whether the call ended because it was blocked. The call records can also include data speed, such as what was the download speed and the upload speed during the data call session. The input 250 can be large because it contains per user information and can require large memory and processing power to analyze.

Inputs 260 can include data about telecommunication network availability, alarms, and outages for the nodes serving the user. The input 260 can indicate whether the hardware, such as a cell tower, a sector, or an antenna, of the telecommunication network has failed.

The preprocessing step 270 can be performed by a hardware or a software processor the same as, or different from, the processor executing the AI model 280. The processor performing step 270 can collect, process, and store information received from inputs 210, 220, 230, 240, 250, 260 prior to providing the processed information to the AI 280. The information contained in inputs 210-260 can be distributed over multiple subnetworks of the telecommunication network. The processor can consolidate the distributed information into a central location, at which the processor can then format, access, and analyze the information.

How frequently the processor performs the preprocessing step 270 can depend on the processing power of the processor. If the processing power is limited, the processor can periodically perform the preprocessing step 270, such as daily, weekly, etc. If the processor has sufficient processing power, the processor can perform the preprocessing step 270 continuously, for example, every time the issue is reported by the user.

The processor executing the AI 280 can be a specialized processor such as a tensor processing unit (TPU) or a graphics processing unit (GPU). Both the processor executing the AI 280 and the processor executing the preprocessing step 270 can be physically on the same computer. The processor executing the AI 280 can obtain the reformatted inputs 215 and can produce an output 290.

The output 290 can include a probability, for example, between 0 to 100%, that the customer will leave the network within a predetermined amount of time from now, and a confidence percentage, for example, between 0 to 100%, that the probability is accurate. The predetermined amount of time can be measured in days and can be between 1 and 14 days. For example, the output 290 can indicate that the user's probability of leaving is 50% within seven days from the last time the user reported an issue, and that the confidence in the prediction can be 90%.

Based on the probability, the predetermined amount of time, and the confidence, the system 200 can calculate a priority 205. For example, the priority 205 can be positively correlated to the probability and confidence, and inversely correlated to the number of days. In other words, the higher the probability and confidence, the higher the priority, because the more likely that the user is going to leave, the sooner the reported issue should be resolved. The higher the predetermined amount of time, the lower the priority because there is more time to fix the issue prior to the user leaving.

Once the priority has been determined, the system 200 can translate the priority into an amount of time, such as hours or days, indicating when the reported issue should be fixed. Upon translation, the lower priority number can indicate higher priority issue, because the lower priority number can imply a high probability that the user will leave. The system 200 can insert the amount of time into a ticket describing the reported issue, and send both to an engineering team to resolve.

Figure 3:
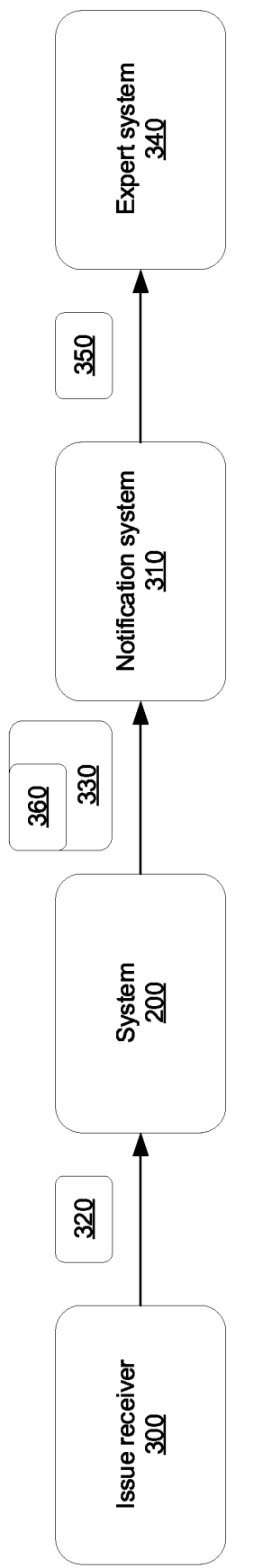
FIG. 3 shows how the system operates with other systems in the wireless telecommunication network.

FIG. 3 shows how the system 200 operates with other systems in the wireless telecommunication network. The system 200 can operate between the issue receiver 300 and a notification system 310. When the user calls to report the issue, the issue receiver 300 receives the call and determines whether the issue can be resolved quickly, such as during the ongoing call. The issue receiver 300 can be automated and can be a natural language processing system. If the issue cannot be resolved, the issue receiver 300 creates a ticket 320. The ticket 320 can include the default priority, such as three days, to resolve the issue.

The system 200 can receive the ticket 320 from the issue receiver 300 and can determine the priority of the issue based on the various inputs 210, 260 in FIG. 2. The system 200 can express the priority as a number of hours or days to resolve the issue, and can modify the default priority of the ticket 320 to generate a ticket 330. The new priority 360 can be included in the ticket 330. The system 200 can send the ticket 330 to the notification system 310. The notification system 310 can receive the ticket 330 and can notify an engineering team or an expert system 340. The format of a notification 350 can depend on the priority 360 contained in the ticket 350. For example, the higher the priority, the more visible or audible the notification is.

Figure 4:
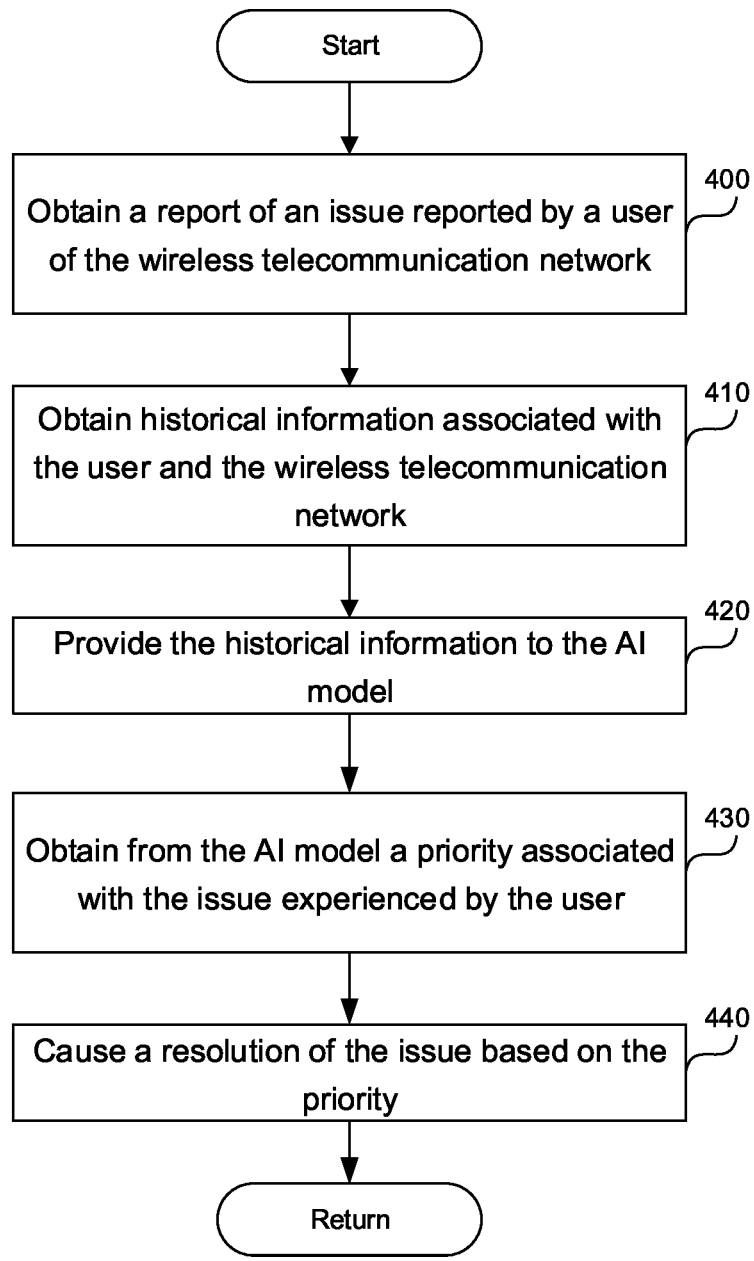
FIG. 4 is a flowchart of a method to determine a priority of an issue reported by a user of a wireless telecommunication network.

FIG. 4 is a flowchart of a method to determine a priority of an issue reported by a user of a wireless telecommunication network. In step 400, a processor can obtain a report of an issue reported by a user of the wireless telecommunication network. The issue can include a dropped call, slow download speeds, slow upload speeds, noisy signal, no coverage/signal, blocked calls, bad voice quality, one-way audio, etc.

In step 410, the processor can obtain historical information associated with the user and the wireless telecommunication network. The historical information can include an indication of an existence of multiple issues reported by the user such as multiple issues reported by the user and/or multiple issues similar to the reported issue all of which have been reported by the user. If the user has reported prior issues, the processor can increase the priority of the newly reported issue because the user is more likely to leave the telecommunication network.

The historical information can include multiple issues reported by users similar to the user, multiple user statuses associated with the users similar to the user, performance and capacity statistics of a network component serving the user, performance statistics of the telecommunication network (or portion thereof) serving the user, and/or an issue associated with the component of the wireless telecommunication network serving the user. The user status among the multiple user statuses can include active, inactive, and dormant. Active user status represents an active user of the telecommunication network, inactive user status represents the user of the telecommunication network that has left the network, and a dormant user status represents the user that has not used the telecommunication network for a predetermined amount of time such as one month, two months, etc.

To obtain the multiple issues reported by users similar to the user, the processor can determine the similar users by determining a geographical area associated with the user and determining multiple users reporting an issue when located in the geographical area associated with the user within a predetermined timeframe. The predetermined timeframe can include a timeframe during which a topology of a portion of the wireless telecommunication network serving the geographical area remained the same. In other words, the topology of the portion of the wireless telecommunication network was not changed in terms of number of cell towers and/or connectivity of the cell towers. The processor can obtain the multiple issues reported by the similar users.

To obtain the historical information associated with the user and the wireless telecommunication network, the processor can obtain performance and capacity statistics of a component serving the user. The component can be a portion of the wireless telecommunication network, a cell tower, a sector, and/or an antenna. The network performance can include availability of the component, alarms associated with the component and/or outages associated with the component serving the user. The historical information can be particular to the performance and capacity statistics of the component when the component is serving the user.

The obtained reports by multiple users can be used to prioritize resolution of known technical issues with the network, such as an issue with a software of the telecommunication network, a router, a base station, an antenna, etc. The processor can obtain an issue associated with a component of the wireless telecommunication network, such as a high number of dropped calls, low download speeds, etc. The processor can obtain second multiple user statuses associated with multiple users served by the component of the wireless telecommunication network. The multiple user statuses can indicate how many among the multiple users served by the component have left the network. The processor can prioritize a resolution of the issue associated with the component of the wireless telecommunication network based on the second multiple user statuses. For example, if a high percentage of the multiple users is inactive, such as over 50%, the processor can increase the priority of the issue.

In step 420, the processor can provide the historical information to the AI model. Prior to providing the historical information, the processor can transform the historical information into a formatted data adapted to be processed by an artificial intelligence (AI) model. To perform the transformation, the processor can determine a processing power associated with a processor performing the transformation. The processor can adjust a frequency of transforming the historical information based on the processing power.

For example, the higher the processing power, the higher the frequency. If the processing power is limited, the processor can perform the transformation daily or weekly, depending on how quickly the transformation can be completed. The highest frequency of the transformation cannot exceed the time the processor needs to complete a single transformation. For example, if a processor needs three days to complete a single transformation, the frequency of performing the transformation can be three days or more. If the processing power is higher than the frequency of updating the historical information, the processor can perform the transformation continuously, as new historical information is generated.

In step 430, the processor can obtain from the AI model a priority associated with the issue experienced by the user. To obtain the priority, the processor can obtain from the AI model a probability that the user disengages from the wireless telecommunication network within a predetermined number of days and a confidence associated with the probabilities. The processor can determine the priority associated with the issue experienced by the user based on the probability, the predetermined number of days and the confidence, as described in this application.

In step 440, the processor can cause a resolution of the issue based on the priority. For example, the processor can modify the report of the issue to include the priority associated with the issue.

Computer

Figure 5:
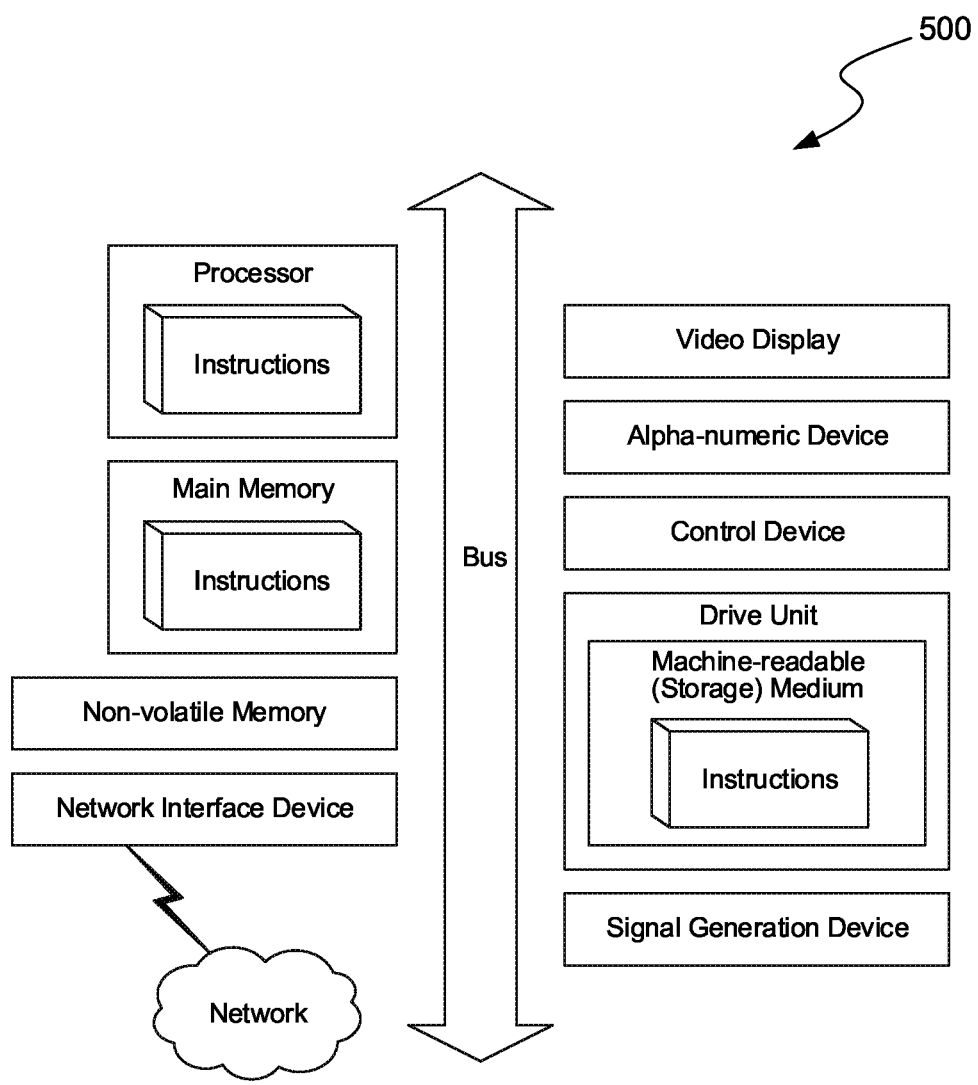
FIG. 5 is a diagrammatic representation of a machine in the example form of a computer system within which a set of instructions, for causing the machine to perform any one or more of the methodologies or modules discussed herein, can be executed.

FIG. 5 is a diagrammatic representation of a machine in the example form of a computer system 500 within which a set of instructions, for causing the machine to perform any one or more of the methodologies or modules discussed herein, can be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components described in the example of FIGS. 1-4 (and any other components described in this specification) can be implemented. The computer system 500 can be of any applicable known or convenient type. The components of the computer system 500 can be coupled together via a bus or through some other known or convenient device.

The processor of the computer system 500 can be the processor executing instructions described in this application, for example in FIG. 4. The processor of the computer system 500 can perform the preprocessing step 270 in FIG. 2, execute the AI model 280 in FIG. 2, and/or convert output 290 in FIG. 2 to priority 205 in FIG. 2. The processor of the computer system 500 can be associated with the wireless telecommunication network including the cell towers 140, 150, 160 in FIG. 1. The main memory, nonvolatile memory, and/or the drive unit of the computer system 500 can store the instructions described in this application. The network of the computer system 500 can be used to communicate between the telecommunication network and the user equipment (UE) 100, 110, 120 in FIG. 1, and/or between the preprocessing step 270 and the AI model 280, etc.

This disclosure contemplates the computer system 500 taking any suitable physical form. As example and not by way of limitation, computer system 500 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a smartphone, a wearable computer, a vehicle, an embedded system (e.g. in a vehicle), an internet of things (IoT) device, a server, or a combination of two or more of these. Where appropriate, computer system 500 can include one or more computer systems 500; be unitary or distributed; span multiple locations; span multiple machines; or reside in a cloud, which can include one or more cloud components in one or more networks. Where appropriate, one or more computer systems 500 can perform without substantial spatial or temporal limitation one or more steps of one or more methods described or illustrated herein. As an example and not by way of limitation, one or more computer systems 500 can perform in real time or in batch mode one or more steps of one or more methods described or illustrated herein. One or more computer systems 500 can perform at different times or at different locations one or more steps of one or more methods described or illustrated herein, where appropriate.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

While the computer-readable medium or computer-readable storage medium is shown in an exemplary embodiment to be a single medium, the term "computer-readable medium" and "computer-readable storage medium" should be taken to include a single medium or multiple media (e.g., a centralized or distributed database, and/or associated caches and servers) that store the one or more sets of instructions. The term "computer-readable medium" and "computer-readable storage medium" shall also be taken to include any medium that is capable of storing, encoding or carrying a set of instructions for execution by the machine and that cause the machine to perform any one or more of the methodologies or modules of the presently disclosed technique and innovation.

In some circumstances, operation of a memory device, such as a change in state from a binary one to a binary zero or vice versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device can comprise a transformation, such as a physical transformation. Rather, the foregoing are intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. At least one non-transitory computer-readable medium, excluding transitory signals and carrying instructions that, when executed by at least one data processor, perform operations, the operations comprising:
    obtaining an indication of an issue reported by a first subscriber who has subscribed or is subscribing to services provided by a wireless telecommunication network;
    obtaining historical information associated with the first subscriber and the wireless telecommunication network,
        wherein the historical information relates to:
            (1) other issues reported by other subscribers to the wireless telecommunication network, wherein the other subscribers are similar to the first subscriber, and
            (2) other subscriber statuses associated with the other subscribers;
    based on the historical information, quantifying a likelihood that the first subscriber might terminate the services provided by the wireless telecommunication network within a predetermined number of days and a confidence associated with the likelihood; and
    generating a priority associated with the issue experienced by the first subscriber based on at least two of: the likelihood, the predetermined number of days, or the confidence.

2. The at least one non-transitory computer-readable medium of claim 1, wherein obtaining the other issues reported by the other subscribers similar to the first subscriber comprising:
    determining the other subscribers similar to the first subscriber by:
        determining a geographical area associated with the first subscriber;
        determining other subscribers reporting other issues when located in the geographical area associated with the first subscriber within a predetermined timeframe,
            wherein the predetermined timeframe comprises a timeframe during which a topology of a portion of the wireless telecommunication network serving the geographical area remained the same;
        determining the other subscribers to be the other subscribers similar to the first subscriber; and
    obtaining the other issues reported by the other subscribers similar to the first subscriber.

3. The at least one non-transitory computer-readable medium of claim 1, wherein obtaining the historical information associated with the first subscriber and the wireless telecommunication network comprising:
    obtaining performance and capacity statistics of a component serving the first subscriber, wherein the component is associated with the wireless telecommunication network.

4. The at least one non-transitory computer-readable medium of claim 1, further comprising:
    obtaining an issue associated with a component of the wireless telecommunication network;
    obtaining second multiple subscriber statuses associated with second other subscribers served by the component of the wireless telecommunication network; and
    prioritizing a resolution of the issue associated with the component of the wireless telecommunication network based on the second multiple subscriber statuses.

5. The at least one non-transitory computer-readable medium of claim 1, wherein transforming the historical information further comprises:
    determining a processing power associated with a processor performing the transforming; and
    adjusting a frequency of the transforming the historical information based on the processing power.

6. A method, comprising:
    obtaining an indication of an issue reported by a first user of a wireless telecommunication network;
    obtaining historical information associated with the first user and the wireless telecommunication network,
        wherein the historical information relates to:
            (1) other issues reported by other users who are similar to the first user, and
            (2) other user statuses associated with the other users;
    based on the historical information, determining a probability that the first user disengages from the wireless telecommunication network within a predetermined number of days and a confidence associated with the probability; and determining a priority associated with the issue experienced by the first user based on at least two of: the probability, the predetermined number of days, or the confidence.

7. The method of claim 6, wherein obtaining the other issues reported by the other users similar to the first user comprising:
determining the other users similar to the first user by:
determining a geographical area associated with the first user;
determining other users reporting other issues when located in the geographical area associated with the first user within a predetermined timeframe,
wherein the predetermined timeframe comprises a timeframe during which a topology of a portion of the wireless telecommunication network serving the geographical area remained the same;
determining the other users to be the other users similar to the first user; and
obtaining the other issues reported by the other users similar to the first user.

8. The method of claim 6, further comprising:
transforming the historical information into a formatted data adapted to be processed by an AI model.

9. The method of claim 6, further comprising:
transforming the historical information into a formatted data adapted to be processed by an AI model;
determining a processing power associated with a processor performing the transforming; and
adjusting a frequency of the transforming the historical information based on the processing power.

10. The method of claim 6, wherein obtaining the historical information associated with the first user and the wireless telecommunication network comprising:
obtaining an indication of an existence of other issues reported by the first user.

11. The method of claim 6, wherein determining the priority includes:
obtaining from an AI model, a probability that the first user disengages from the wireless telecommunication network within a predetermined number of days and a confidence associated with the probability; and
determining the priority associated with the issue experienced by the first user based on the probability, the predetermined number of days and the confidence.

12. The method of claim 6, wherein obtaining the historical information associated with the first user and the wireless telecommunication network includes:
obtaining performance and capacity statistics of a component serving the first user, wherein the component is associated with the wireless telecommunication network.

13. The method of claim 6, further comprising:
obtaining an issue associated with a component of the wireless telecommunication network;
obtaining second multiplicity of user statuses associated with a second group of other users served by the component of the wireless telecommunication network; and
prioritizing a resolution of the issue associated with the component of the wireless telecommunication network based on the second multiplicity of other user statuses.

14. The method of claim 6, further comprising:
modifying a report of the issue to include the priority.

15. A system comprising:
one or more processors;
at least one memory coupled to the one or more processors, wherein the memory includes instructions executable by the one or more processors to:
obtain an indication of an issue reported by a first user of a wireless telecommunication network;
obtain historical information associated with the first user and the wireless telecommunication network, wherein the historical information relates to (1) other issues reported by other users who are similar to the first user and (2) other user statuses associated with the other users;
based on the historical information, determine a probability that the first user disengages from the wireless telecommunication network within a predetermined number of days and a confidence associated with the probability;
determine a priority associated with the issue experienced by the first user based on at least two of: the probability, the predetermined number of days, or the confidence; and
causing a resolution of the issue based on the priority.

16. The system of claim 15, wherein the instructions further comprise instructions to:
transform the historical information into a formatted data adapted to be processed by an AI model;
determine a processing power associated with a processor performing the transforming; and
adjust a frequency of the transforming the historical information based on the processing power.

17. The system of claim 15, the instructions to obtain the historical information comprising the instructions to:
obtain an indication of an existence of other issues reported by the first user.

18. The system of claim 15, the instructions to determine the priority comprising the instructions to:
obtain from an AI model a probability that the first user disengages from the wireless telecommunication network within a predetermined number of days and a confidence associated with the probability; and
determine the priority associated with the issue experienced by the first user based on the probability, predetermined number of days, and the confidence.

19. The system of claim 15, the instructions to obtain the other issues reported by the other users similar to the first user comprising the instructions to:
determine the other users similar to the first user by:
determining a geographical area associated with the first user;
determining other users reporting other issues when located in the geographical area associated with the first user within a predetermined timeframe,
wherein the predetermined timeframe comprises a timeframe during which a topology of a portion of the wireless telecommunication network serving the geographical area remained the same;
determining the other users to be the other users similar to the first user; and
obtain the other issues reported by the other users similar to the first user.

20. The system of claim 15, the instructions comprising the instructions to:
obtain an issue associated with a component of the wireless telecommunication network;

obtain second other user statuses associated with second other users served by the component of the wireless telecommunication network; and prioritize a resolution of the issue associated with the component of the wireless telecommunication network based on the second other user statuses.

\* \* \* \* \*